(No Model.)
A. D. NORTHRUP.
APPARATUS FOR FEEDING FLOUR AND OTHER MATERIAL.
No. 311,670. Patented Feb. 3, 1885.
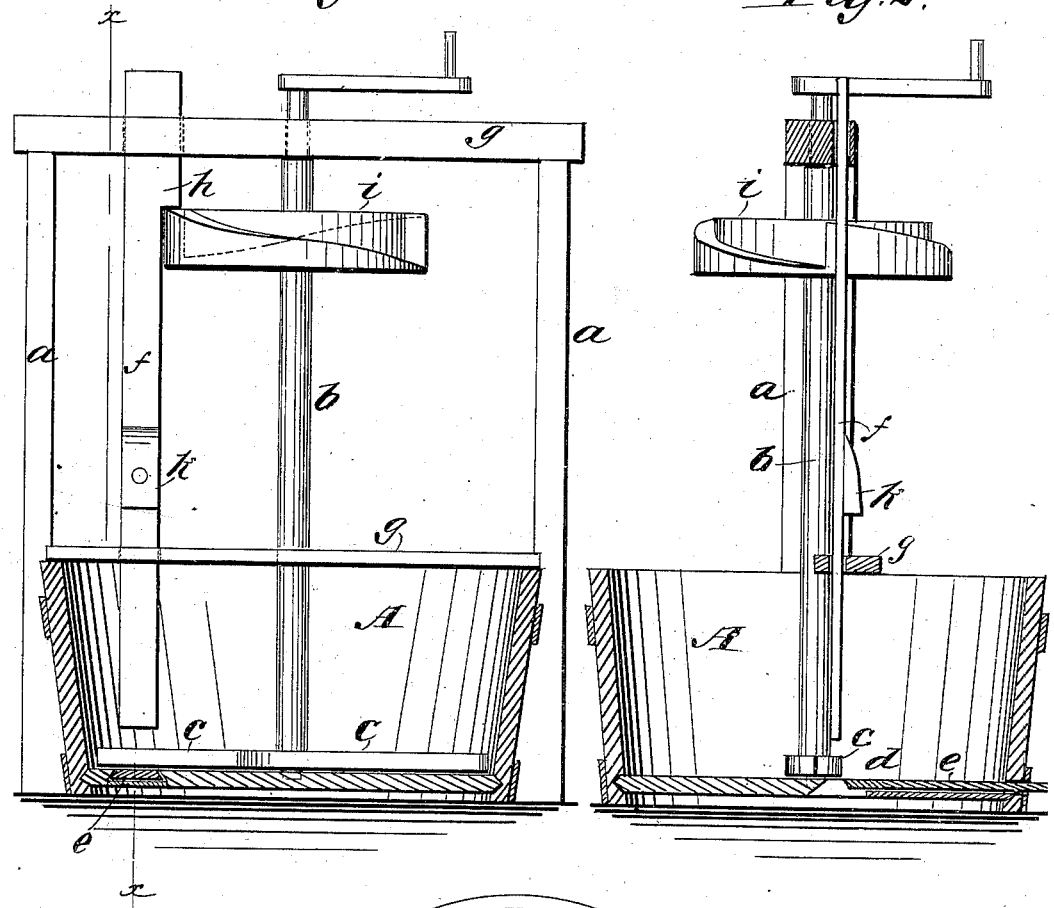
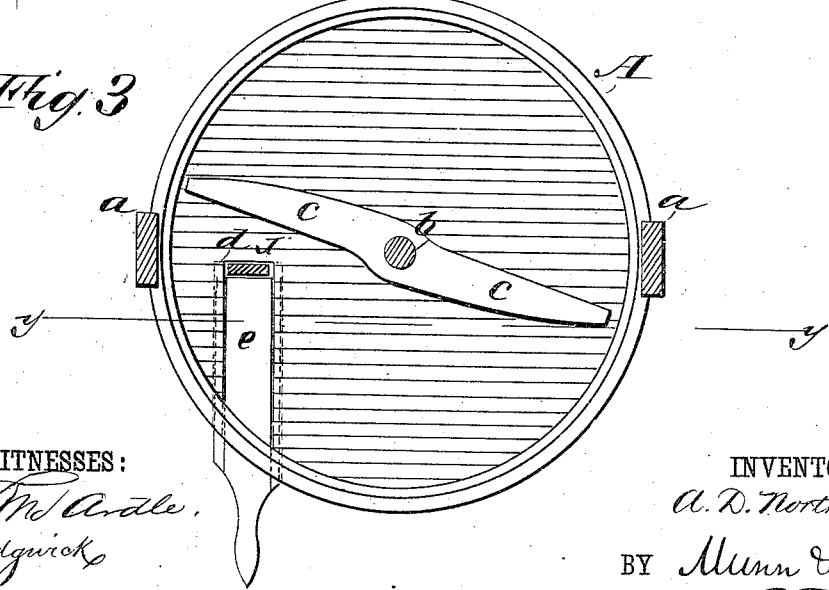
WITNESSES:
F. W. Ardle.
C. Sedgwick.
INVENTOR:
A. D. Northrup
BY Munn & Co.
ATTORNEYS.

UNITED STATES PATENT OFFICE.

ANSON DORASTUS NORTHRUP, OF CARBON, IOWA.

APPARATUS FOR FEEDING FLOUR AND OTHER MATERIAL.

SPECIFICATION forming part of Letters Patent No. 311,670, dated February 3, 1885.

Application filed June 30, 1884. (No model.)

*To all whom it may concern:*

Be it known that I, ANSON D. NORTHRUP, of Carbon, in the county of Adams and State of Iowa, have invented a new and Improved Apparatus for Feeding Flour and other Material, of which the following is a full, clear, and exact description.

My improved apparatus is intended more especially for use in feeding flour in large or small quantities with uniformity and regularity—for instance, in mills when the flour or stuff from the dust-room is to be rebolted; but it may be used for feeding any fine material as well as flour.

The invention consists in the peculiar construction and arrangement of parts, as hereinafter fully described, and pointed out in the claims.

Reference is to be had to the accompanying drawings, forming a part of this specification, in which similar letters of reference indicate corresponding parts in all the figures.

Figure 1 is a vertical section of my improved apparatus on the line $y\ y$ of Fig. 3. Fig. 2 is a vertical section on the line $x\ x$, Fig. 1. Fig. 3 is a plan view, partly in section.

A is a receptacle of suitable size, provided with the standards $a\ a$ and cross-bars $g$, which support the vertical shaft $b$, that carries arms or sweeps $c$ upon the bottom of the receptacle A.

$d$ is an aperture in the bottom of the receptacle, the sides of which are preferably made flaring outward, so as to insure free discharge of the material.

$e$ is a slide extending through the side of the receptacle A, so that it can be moved to cover or close the aperture $d$ more or less.

$f$ is a plunger supported vertically above the aperture $d$ by the cross-bars $g\ g$, and provided near its upper end with a lug or shoulder, $h$, taking upon the cam-wheel $i$, that is attached upon the shaft $b$. The plunger $f$ is provided with a lug or projection at $k$, which takes upon the lower cross-bar, $g$, so as to limit the downward movement.

In the operation of the apparatus the material is placed in the receptacle A and the shaft $b$ rotated by suitable power, thereby giving to the plunger $f$ a vertical reciprocating motion. The plunger by its movement forces the material down into the aperture $d$, and causes its discharge therefrom in a regular and uniform quantity, according to the size of the aperture as regulated by the slide $e$. At the same time the sweeps $c$, moving over the bottom of the receptacle, keep the material loosened up and carry it to the outlet, so that the feed remains uniform until the receptacle is entirely empty. In this manner the flour or other material can be delivered in any quantity as desired, from a mere dust to the full capacity of the outlet.

The apparatus is specially useful for feeding flour for rebolting, or for mixing flour of different grades, and also for mixing the materials of self-raising flour.

Having thus described my invention, I claim as new and desire to secure by Letters Patent—

1. In an apparatus for feeding flour, the combination, with the receptacle A, provided with the flaring aperture $d$, of the plunger $f$ and the cam $i$, substantially as herein shown and described.

2. In an apparatus for feeding flour, the combination, with the apertured receptacle A, provided with the standards $a$ and cross-bars $g$, the shaft $b$, and the cam-wheel $i$, of the plunger $f$, provided with the shoulder $h$ and the projection $k$, substantially as herein shown and described.

ANSON DORASTUS NORTHRUP.

Witnesses:
 CHARLES W. HARLOW,
 SEYMOUR D. SELBY.